United States Patent
Tanaka et al.

(10) Patent No.: US 9,683,093 B1
(45) Date of Patent: Jun. 20, 2017

(54) RESIN COMPOSITION AND RESIN MOLDED ARTICLE

(71) Applicant: FUJI XEROX CO., LTD., Tokyo (JP)

(72) Inventors: Ryo Tanaka, Kanagawa (JP); Hisae Yoshizawa, Kanagawa (JP); Kenji Yao, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/218,843

(22) Filed: Jul. 25, 2016

(30) Foreign Application Priority Data

Mar. 16, 2016 (JP) .................. 2016-052881

(51) Int. Cl.
  *C08L 1/12* (2006.01)
(52) U.S. Cl.
  CPC .................... *C08L 1/12* (2013.01)
(58) Field of Classification Search
  CPC ........................................ C08L 1/12
  See application file for complete search history.

(56) References Cited

U.S. PATENT DOCUMENTS 5,009,895 A * 4/1991 Lui ............... A61K 9/2054
  424/465

FOREIGN PATENT DOCUMENTS

JP 2006-299012 A 11/2006

OTHER PUBLICATIONS

Fedors, Robert F., "A Method for Estimating Both the Solubility Parameters and Molar Volumes of Liquids," Polymer Engineering and Science, Feb. 1974, vol. 14, No. 2, pp. 147-154.

* cited by examiner

*Primary Examiner* — Melvin C Mayes
*Assistant Examiner* — Stefanie Cohen
(74) *Attorney, Agent, or Firm* — Oliff PLC

(57) ABSTRACT

A resin composition includes cellulose derivatives, wherein, in a molecular weight distribution curve obtained by subjecting the cellulose derivatives to gel permeation chromatography (GPC), a maximum ($P_L$) exists in a low molecular weight region of 10,000 to 40,000 and a maximum ($P_H$) exists in a high molecular weight region of 100,000 to 180,000, and with respect to a total amount of a peak area ($S_L$) of a peak including the maximum ($P_L$) and a peak area ($S_H$) of a peak including the maximum ($P_H$), a ratio of the peak area ($S_L$) is 1% to 99% and a ratio of the peak area ($S_H$) is from 1% to 99%.

6 Claims, 4 Drawing Sheets

FIG. 3

RESIN COMPOSITION AND RESIN MOLDED ARTICLE

CROSS-REFERENCE TO RELATED APPLICATIONS

This application is based on and claims priority under 35 USC 119 from Japanese Patent Application No. 2016-052881 filed Mar. 16, 2016.

BACKGROUND

1. Technical Field

The present invention relates to a resin composition and a resin molded article.

2. Related Art

In the related art, various resin compositions are provided to be used for various applications. Particularly, thermoplastic resins are used in various components and housings of home appliances or automobiles, or in components such as housings of business machines and electric and electronic apparatuses.

Recently, resins derived from plants are used, and a cellulose derivative is one of the resins derived from plants which are well-known from the past.

SUMMARY

According to an aspect of the invention, there is provided a resin composition including:

cellulose derivatives, wherein, in a molecular weight distribution curve obtained by subjecting the cellulose derivatives to gel permeation chromatography (GPC), a maximum ($P_L$) exists in a low molecular weight region of 10,000 to 40,000 and a maximum ($P_H$) exists in a high molecular weight region of 100,000 to 180,000, and with respect to a total amount of a peak area ($S_L$) of a peak including the maximum ($P_L$) and a peak area ($S_H$) of a peak including the maximum ($P_H$), a ratio of the peak area ($S_L$) is from 1% to 99% and a ratio of the peak area ($S_H$) is from 1% to 99%.

BRIEF DESCRIPTION OF THE DRAWINGS

Exemplary embodiments of the present invention will be described in detail based on the following figures, wherein.

DETAILED DESCRIPTION

Hereinafter, embodiments of a resin composition and a resin molded article according to the invention are described.

<Resin Composition>

According to this embodiment, a resin composition according to a first embodiment contains cellulose derivatives in which a maximum ($P_L$) exists in a low molecular weight region of 10,000 to 40,000, and a maximum ($P_H$) exists in a high molecular weight region of 100,000 to 180,000, in a molecular weight distribution curve obtained by gel permeation chromatography (GPC), and, with respect to a total amount of a peak area ($S_L$) of a peak including the maximum ($P_L$) and a peak area ($S_H$) of a peak including the maximum ($P_H$), a ratio of the peak area ($S_L$) is from 1% to 99% and a ratio of the peak area ($S_H$) is from 1% to 99%.

Here, the fact that the maximum ($P_L$) and the maximum ($P_H$) exist in the low molecular weight region and the high molecular weight region in the molecular weight distribution curve means that a cellulose derivative having a low molecular weight (for example, a cellulose derivative having a weight average molecular weight Mw of 10,000 to 55,000) and a cellulose derivative having a high molecular weight (for example, a cellulose derivative having a weight average molecular weight Mw of 100,000 to 235,000) are mixed.

A resin composition according to a second embodiment contains mixed cellulose derivatives of a low molecular weight cellulose derivative having a weight average molecular weight Mw of 10,000 to 55,000 and a high molecular weight cellulose derivative having a weight average molecular weight Mw of 100,000 to 235,000.

While a low molecular weight region is from 10,000 to 40,000 and a high molecular weight region is from 100,000 to 180,000 in the resin composition according to the first embodiment, the weight average molecular weight Mw of the low molecular weight cellulose derivative is from 10,000 to 55,000 and the weight average molecular weight Mw of the high molecular weight cellulose derivative is from 100,000 to 235,000 in the resin composition according to the second embodiment as described above, and ranges of the numerical values are different. This is because, if a sample in which a molecular weight distribution curve has one peak is generally measured by gel permeation chromatography (GPC), a weight average molecular weight is higher than a molecular weight in the greatest maximum in some cases. Specifically, a weight average molecular weight is about a value of 1.3 times (for example, about 1.1 times to 1.4 times) with respect to the value of the molecular weight in the greatest maximum.

According to the resin composition of the first embodiment or the second embodiment, a resin molded article having excellent mechanical strength may be obtained, and thus high thermal fluidity is exhibited.

The reason that this effect is exhibited is assumed as follows.

Generally, with respect to the cellulose derivative, a resin molded article having excellent mechanical strength and heat resistance may be obtained, from the characteristics of the chemical structure and the characteristics in that hydrogen bonding force in a molecule or between molecules. However, thermal fluidity (that is, decrease of melt viscosity when heat is applied) is low, and enhancement of the molding suitability when heat-melting is performed for molding is preferable.

Here, a method of increasing thermal fluidity by decreasing a melting temperature may be considered as a method of enhancing molding suitability of the cellulose derivative, and examples thereof include a method of increasing thermal fluidity by adding a plasticizer. However, as the plasticity increases, the elastic modulus decreases, that is, mechanical strength is deteriorated. Therefore, the thermal fluidity and the mechanical strength of the cellulose derivative have an inconsistent relationship, and it is not easy to realize the enhancement of the both. The plasticizer may increase thermal fluidity as an addition amount thereof increases, but the plasticizer may precipitate (bleed out).

In contrast, the resin composition according to the first embodiment in this embodiment is a resin composition in which a cellulose derivative having a low molecular weight (for example, Mw of 10,000 to 55,000) and a cellulose derivative having a high molecular weight (for example, Mw of 100,000 to 235,000) are mixed as described above. The resin composition according to the second embodiment contains mixed cellulose derivatives of a low molecular weight cellulose derivative having a weight average molecular weight Mw of 10,000 to 55,000 and a high molecular weight cellulose derivative having a weight average molecular weight Mw of 100,000 to 235,000.

In general, in a resin, as a molecular weight decreases, the strength tends to decrease. However, with respect to the cellulose derivative, as the molecular weight decreases, the number of terminals of molecule chains comparatively increases, and the number of hydroxyl groups existing in the terminals thereof also increases. Therefore, it is considered that, even if a cellulose derivative having a low molecular weight (Mw of 10,000 to 55,000) is used together with a cellulose derivative having a high molecular weight (Mw of 100,000 to 235,000), hydrogen bonds (for example, hydrogen bonds between the hydroxyl groups at the terminals or bonds between the hydroxyl group at the terminal and the hydroxyl group existing at a branch) derived from hydroxyl groups at the terminals after molding are formed in the cellulose derivative having a low molecular weight so as to cause the hydrogen bonding force to become strong, such that mechanical strength increases (for example, elastic modulus enhances, or impact resistance strength increases). It is also considered that excellent heat resistance may be obtained by the influence of this hydrogen bonding force.

It is considered that, since a hydrogen bond between the terminals becomes weak when heat-melting is performed, if the cellulose derivative having a low molecular weight is used in combination, the viscosity decreases, and thermal fluidity increases, such that high fluidity is exhibited.

However, generally, in the case where a cellulose derivative having a low molecular weight of which thermal fluidity is higher are used together with a cellulose derivative having a high molecular weight of which the thermal fluidity is lower, it is expected that thermal fluidity of this mixture changes in proportion to a mixture ratio of the both. That is, in general, if the amount of the cellulose derivative having a low molecular weight increases, it is expected that the thermal fluidity increases in proportion to the amount. However, in this embodiment, it is found that, if the cellulose derivative having a low molecular weight is used in combination with the cellulose derivative having a high molecular weight, the thermal fluidity rapidly increases, that is, it is known that the thermal fluidity does not change in proportion to the mixture ratio of the both, but the thermal fluidity synergistically enhances.

Therefore, according to this embodiment, if the cellulose derivative having a low molecular weight and the cellulose derivative having a high molecular weight are used together, extremely high mechanical strength and extremely high thermal fluidity are compatible with each other.

In the case where the plasticizer is contained in this embodiment, a resin molded article having excellent mechanical strength may be obtained, higher thermal fluidity (for example, high fluidity at the temperature of 230° C. to 240° C.) is exhibited, and also the precipitation (bleed-out) of the plasticizer is prevented.

With respect to the effect that is exhibited, first, since, in the resin compositions according to the first and second embodiments in this embodiment, the cellulose derivative having a low molecular weight (Mw of 10,000 to 55,000) is used together with the cellulose derivative having a high molecular weight (Mw of 100,000 to 235,000), the cellulose derivative having a low molecular weight have strong hydrogen bonding force as described above, less entanglement between molecules compared with other high molecular compounds having the same molecular weight, and high mobility of molecules, so as to easily flow. Therefore, in the mixture of the cellulose derivative having a high molecular weight and the cellulose derivative having a low molecular weight, it is easy to cause the plasticizer to more effectively function to the cellulose derivatives, and the viscosity decreases, such that thermal fluidity increases. As a result, it is considered that the temperature dependency of the melt viscosity decreases.

Further, as described above, in the cellulose derivatives, as the molecular weight decreases, the number of hydroxyl groups existing at the terminals of the molecule chains relatively increases, and the hydrogen bonds derived from these hydroxyl groups after molding increase. Therefore, it is assumed that the interaction with the plasticizer increases according to the increase of the hydrogen bonds, the plasticizer hardly precipitates, and thus the bleed-out is prevented.

—Resin Composition According to First Embodiment—

With respect to the cellulose derivatives contained in the resin composition according to the first embodiment, in the molecular weight distribution curve obtained by the gel permeation chromatography (GPC), the maximum ($P_L$) exists in the low molecular weight region of 10,000 to 40,000 and the maximum ($P_H$) exists in the high molecular weight region of 100,000 to 180,000.

Also, with respect to a total amount of the peak area ($S_L$) of the peak including the maximum ($P_L$) and the peak area ($S_H$) of the peak including the maximum ($P_H$), the ratio of the peak area ($S_L$) is 1% to 99% and the ratio of the peak area ($S_H$) is 1% to 99%.

In the case where two or more maximums exist in the low molecular weight region (10,000 to 40,000), the highest maximum point among these is called a "maximum ($P_L$)". In the case where two or more maximums exist in the high molecular weight region (100,000 to 180,000), the highest maximum point among these is called a "maximum ($P_H$)".

Here, the "peak area" is described.

(Aspect 1)

Figure 1:
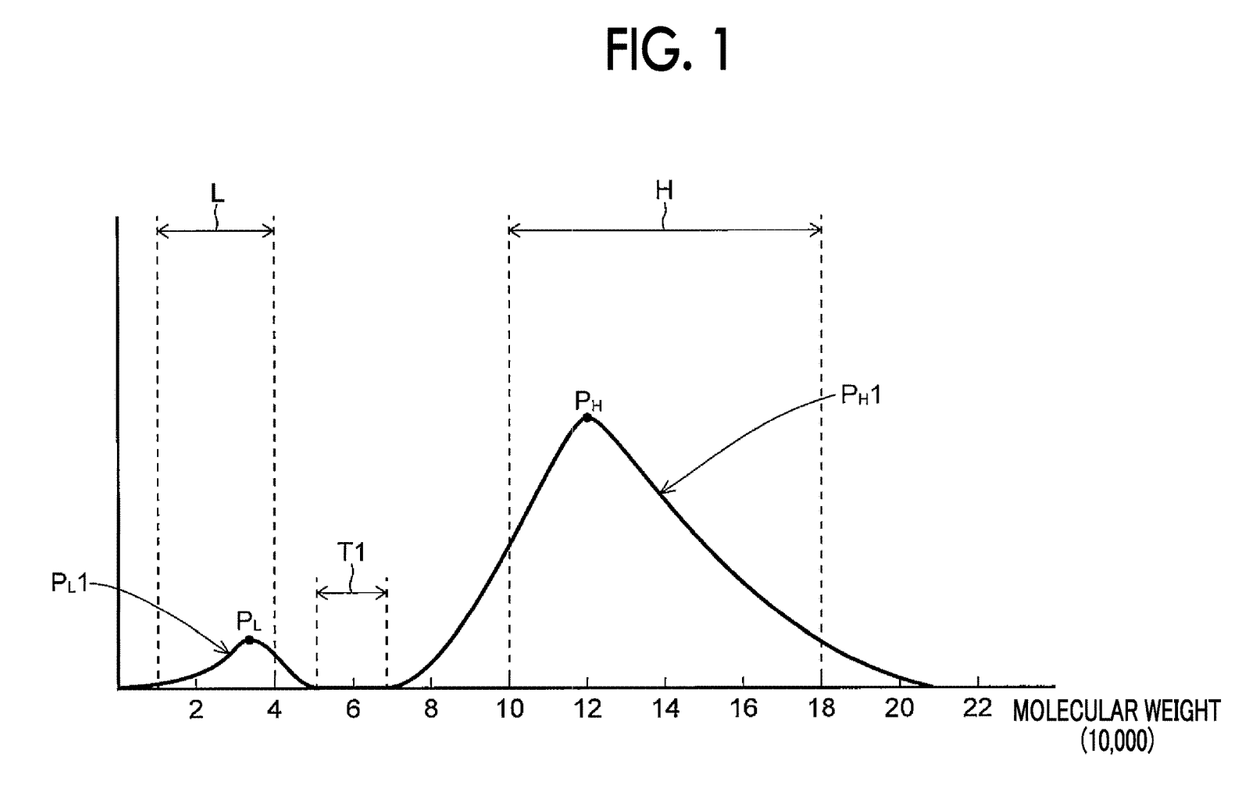
FIG. 1 is a graph schematically illustrating an example of a molecular weight distribution curve that may be obtained by gel permeation chromatography with respect to cellulose derivatives.

According to the first embodiment, in the molecular weight distribution curve of the cellulose derivatives, there are at least two maximums (the maximum ($P_L$) and the maximum ($P_H$)) in a low molecular weight region (L) of 10,000 to 40,000 and a high molecular weight region (H) of 100,000 to 180,000. For example, as illustrated in FIG. 1, in the case where there are a peak ($P_L1$) having the maximum ($P_L$) as a highest point and a peak ($P_H1$) having the maximum ($P_H$) as a highest point and the both peaks exist with a bottom T1 interposed therebetween, a peak area of the peak ($P_L1$) refers to an area of a peak portion in a region having a smaller molecular weight than the bottom T1, and a peak area of the peak ($P_H1$) refers to an area of a peak portion in a region having a greater molecular weight than the bottom T1.

(Aspect 2)

Figure 2:
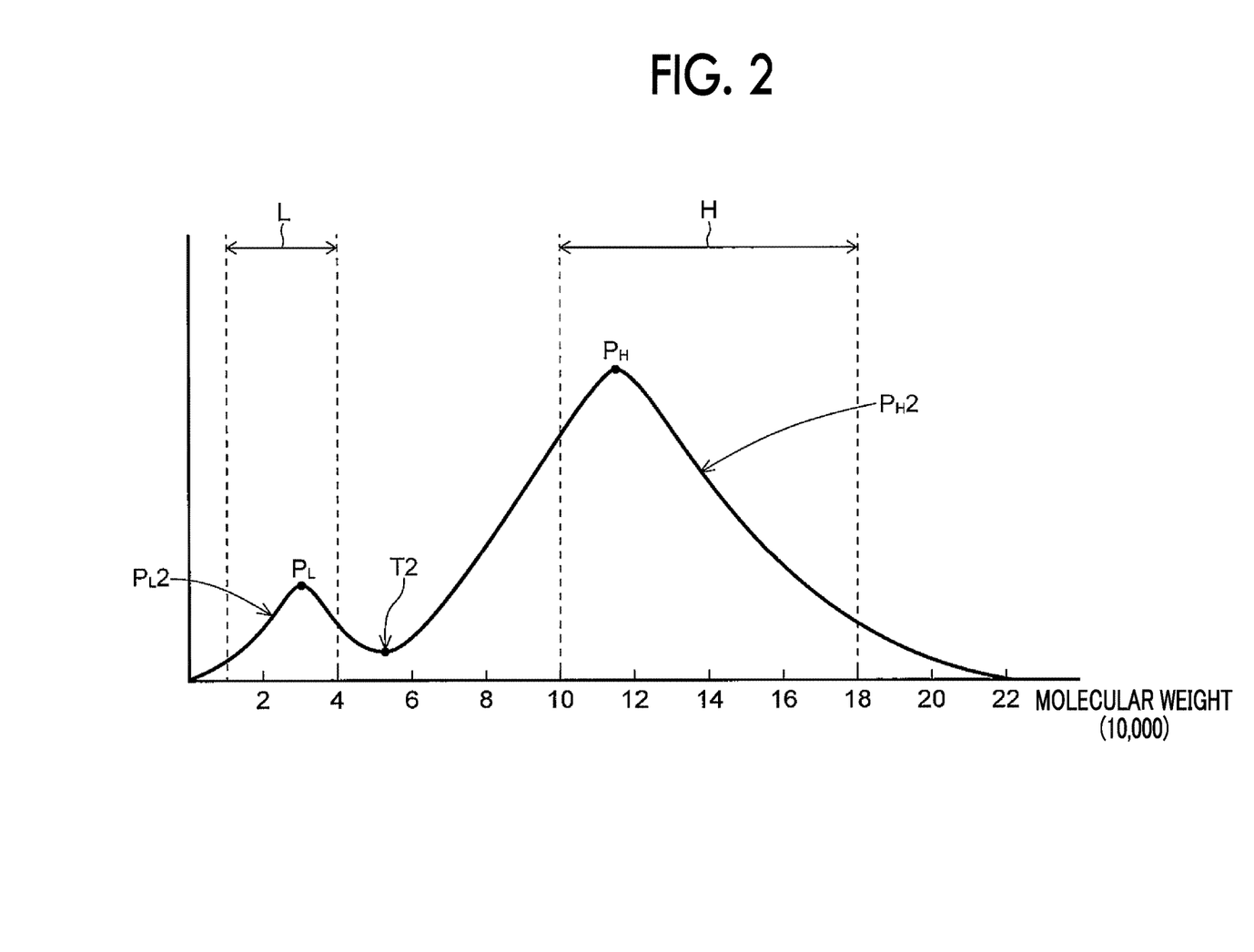
FIG. 2 is a graph schematically illustrating another example of a molecular weight distribution curve that may be obtained by gel permeation chromatography with respect to cellulose derivatives.

As illustrated in FIG. 2, in the case where there are a peak ($P_L2$) having the maximum ($P_L$) as a highest point and a peak ($P_H2$) having the maximum ($P_H$) as a highest point, but the peaks are connected via a minimum point T2, a peak area of the peak ($P_L2$) refers to an area of a peak portion in a region having a smaller molecular weight than the minimum point T2, and a peak area of the peak ($P_H2$) refers to an area of a peak portion in a region having a greater molecular weight than the minimum point T2.

(Aspect 3)

Figure 3:
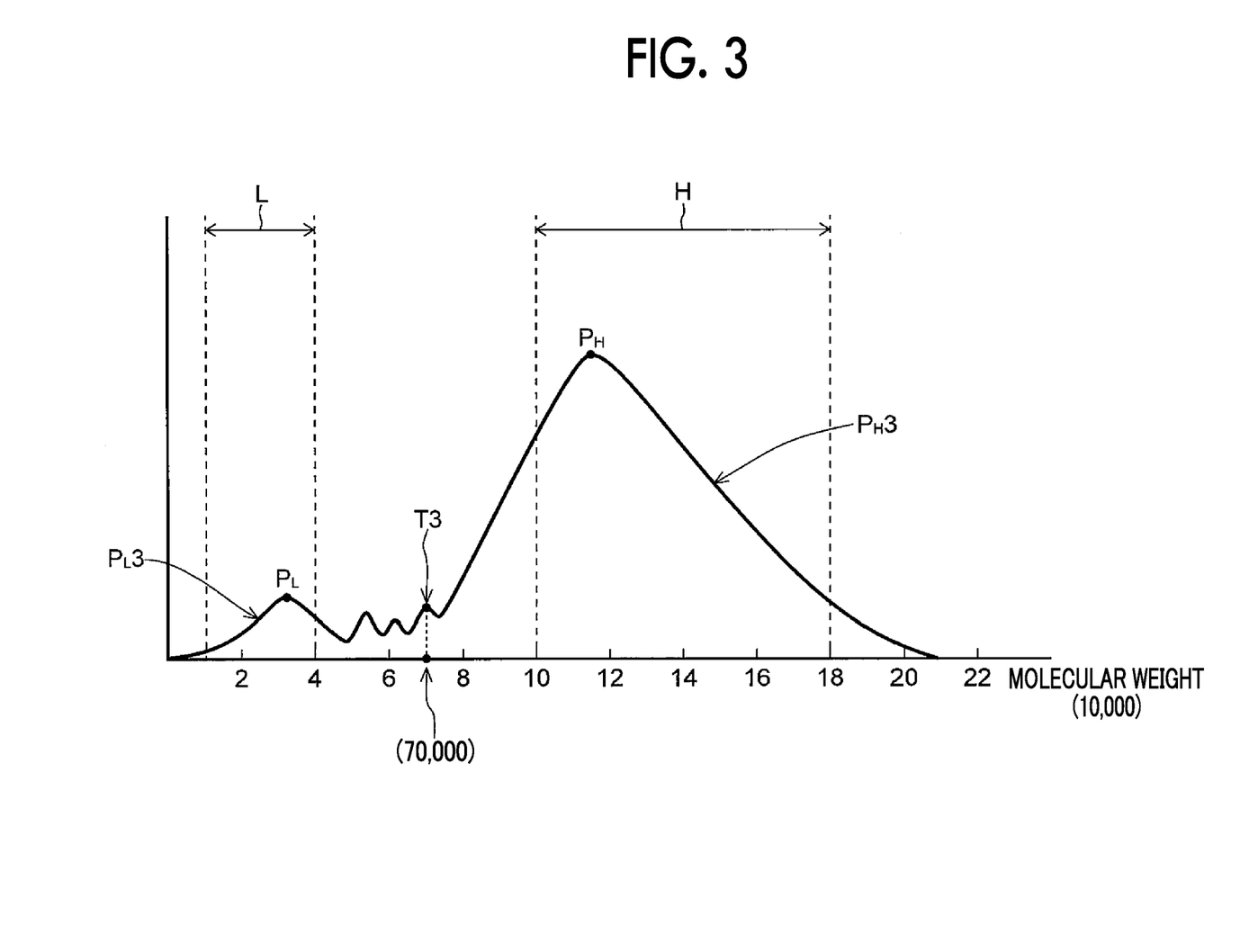
FIG. 3 is a graph schematically illustrating another example of a molecular weight distribution curve that may be obtained by gel permeation chromatography with respect to cellulose derivatives.

As illustrated in FIG. 3, in the case where there are a peak ($P_L3$) having the maximum ($P_L$) as a highest point and a peak ($P_H3$) having the maximum ($P_H$) as a highest point, one or more maximums having low height exist between both of the peaks, and a boundary between the peak ($P_L3$) and the peak ($P_H3$) is not clear, a point (T3) having a molecular weight of 70,000 is set to be a boundary of the peak. That is, a peak area of the peak ($P_L3$) refers to an area of a peak portion in a region having a smaller molecular weight than the point T3 having a molecular weight of 70,000, and a peak area of the peak ($P_H3$) refers to an area of a peak portion in a region having a greater molecular weight than the point T3 having a molecular weight of 70,000.

Figure 4:
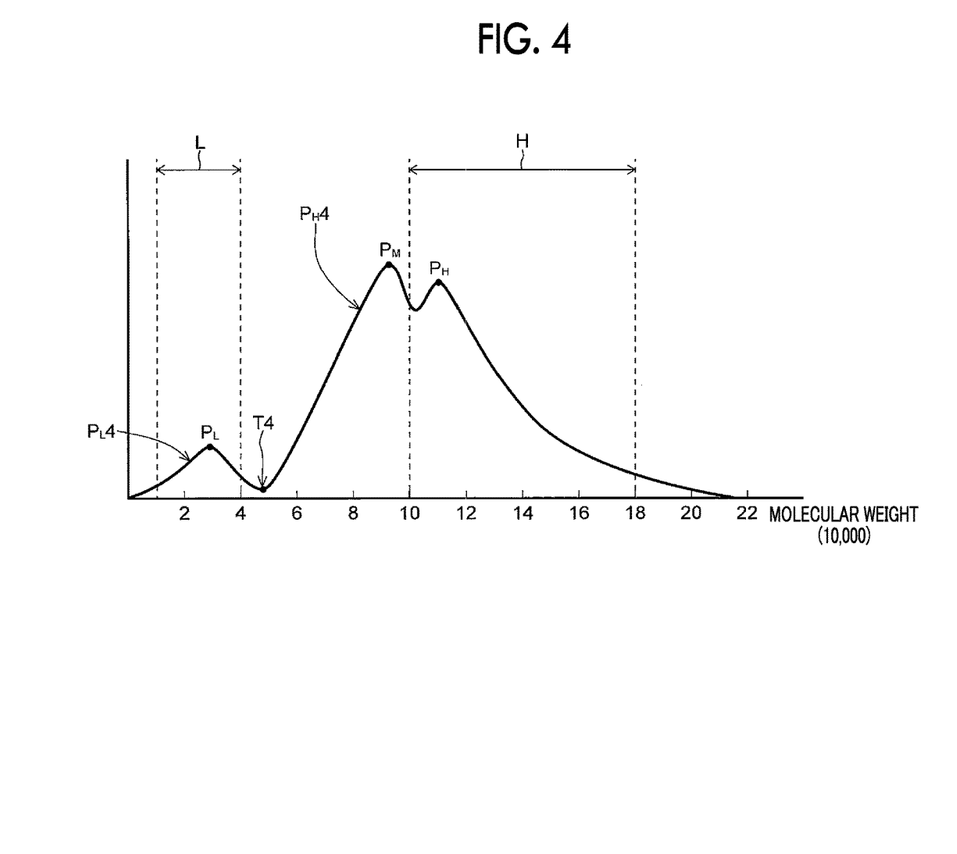
FIG. 4 is a graph schematically illustrating another example of a molecular weight distribution curve that may be obtained by gel permeation chromatography with respect to cellulose derivatives.

The maximum ($P_L$) and the maximum ($P_H$) may not be highest points of the peaks. For example, as illustrated in FIG. 4, a peak ($P_H4$) including the maximum ($P_H$) may have a maximum ($P_M$) having high height than the maximum ($P_H$) in a region of less than 100,000. In this case, the peak ($P_H4$) is considered as one peak including the maximum ($P_H$) and the maximum ($P_M$), the peak area of the peak ($P_H4$) and a peak ($P_L4$) including the maximum ($P_L$) is determined according to (Aspect 1) to (Aspect 3) described above. That is, in the aspect illustrated in FIG. 4, the peak area of the peak ($P_L4$) refers to an area of a peak portion in a region having a smaller molecular weight than a minimum point T4, and the peak area of the peak ($P_H4$) refers to an area of a peak portion in the region having a greater molecular weight than the minimum point T4.

Of course, the peak including the maximum ($P_L$) in the low molecular weight region may have the maximum ($P_M$) having the higher height than the maximum ($P_L$) in the region greater than 40,000.

It is preferable that, in the region of less than 10,000 in the molecular weight distribution curve, a maximum point higher than the maximum ($P_L$) does not exist. In the molecular weight distribution curve, a maximum point higher than the maximum ($P_H$) does not preferably exist in the region greater than 180,000.

In the region having even higher molecular weight than the region in which a peak including the maximum ($P_H$) exists, another peak (ultrahigh molecular weight peak) may exist with a bottom interposed between the peaks. However, in this case, the area of the ultrahigh molecular weight peak may not be included the peak area of the peak including the maximum ($P_H$). In the region having the even lower molecular weight than the region in which a peak including the maximum ($P_L$) exists, another peak (ultra-low molecular weight peak) exists with the bottom interposed between the peaks. However, in this case, the area of this ultra-low molecular weight peak may not be included in the peak area of the peak including the maximum ($P_L$).

The total amount of the peak area of the ultrahigh molecular weight peak and the peak area of the ultra-low molecular weight peak is preferably 10% or less and more preferably 3% or less with respect to the total area of all the peaks, and the total amount is preferable as the total amount is closer to 0%.

The measurement of the weight average molecular weight (Mw) and the drawing of the molecular weight distribution curve are performed by gel permeation chromatography (GPC). Specifically, the molecular weight by GPC is measured with a GPC apparatus (manufactured by Tosoh corporation, HLC-8320GPC, Column: TSKgel α-M) by using a solution of dimethylacetamide/lithium chloride having a volume ratio of 90/10.

Maximum ($P_L$) and Maximum ($P_H$)

According to the first embodiment, the region in which the maximum ($P_L$) exists in the molecular weight distribution curve is 10,000 to 40,000. This means that a cellulose derivative having a low molecular weight (for example, a cellulose derivative having the weight average molecular weight Mw of 10,000 to 55,000) exists.

The region in which the maximum ($P_L$) exists is preferably 15,000 to 40,000 and more preferably 25,000 to 35,000.

If the region in which the maximum ($P_L$) exists is greater than 40,000, thermal fluidity may not be obtained when a resin molded article is formed. Meanwhile, if the region in which the maximum ($P_L$) exists is less than 10,000, the molecular weight becomes too low, such that mechanical strength may not obtained, and heat resistance also is deteriorated.

According to the first embodiment, the region in which the maximum ($P_H$) exists in the molecular weight distribution curve is 100,000 to 180,000. This means that a cellulose derivative having a high molecular weight (for example, a cellulose derivative having a weight average molecular weight Mw of 100,000 to 235,000) exists.

The region in which the maximum ($P_L$) exists is preferably 100,000 to 150,000 and more preferably 100,000 to 130,000.

If the region in which the maximum ($P_H$) exists is greater than 180,000, the molecular weight becomes too great, and the thermal fluidity may not be obtained. Meanwhile, if the region in which the maximum ($P_H$) exists is less than 100,000, the mechanical strength may not be obtained, and the heat resistance is also deteriorated.

The cellulose derivatives used in the first embodiment in which the maximum ($P_L$) exists in the low molecular weight region and the maximum ($P_H$) exists in the high molecular weight region may be prepared by mixing a cellulose derivative having a low molecular weight (for example, the weight average molecular weight Mw of 10,000 to 55,000) and a cellulose derivative having a high molecular weight (for example, the weight average molecular weight Mw of 100,000 to 235,000). That is, the cellulose derivatives may be achieved with the resin composition according to the second embodiment described below.

Peak Area ($S_L$) and Peak Area ($S_H$)

According to the first embodiment, the ratio of the peak area ($S_L$) is 1% to 99% and the ratio of the peak area ($S_H$) is 1% to 99% with respect to the total area of the peak area ($S_L$) of the peak including the maximum ($P_L$) and the peak area ($S_H$) of the peak including the maximum ($P_H$).

If the both have the area ratio of 1% or greater, both of a cellulose derivative having a low molecular weight and a cellulose derivative having a high molecular weight are appropriately included, an effect in that a resin molded article having excellent mechanical strength and high thermal fluidity may be obtained is exhibited.

An area which is smaller among the peak area ($S_L$) and the peak area ($S_H$) is preferably the peak area ($S_L$). This becomes an index indicating that the cellulose derivative having a high molecular weight (for example, the cellulose derivative having the weight average molecular weight Mw of 100,000 to 235,000) are included more than the cellulose derivative having a low molecular weight (for example, the cellulose derivative having the weight average molecular weight Mw of 10,000 to 55,000).

In the molecular weight distribution curve, the ratio of the peak area ($S_H$) (the peak area of the peak including the maximum ($P_H$) existing in the high molecular weight region) with respect to the total area of all the peaks is preferably 60% or greater, more preferably 70% to 95%, and even more preferably 80% to 90%.

If the ratio of the peak area ($S_H$) with respect to the total area of all the peaks is 60% or greater, many cellulose derivatives having the high molecular weights (for example, the cellulose derivative having the weight average molecular weight Mw of 100,000 to 235,000) are included in the cellulose derivatives, such that the mechanical strength may be excellent and the heat resistance may be also enhanced.

Meanwhile, in the molecular weight distribution curve, the ratio of the peak area ($S_L$) (the peak area of the peak including the maximum ($P_L$) existing in the low molecular weight region) with respect to the total area of all the peaks is preferably 3% to 40%, more preferably 5% to 30%, and even more preferably 10% to 20%.

If the ratio of the peak area ($S_L$) with respect to the total area of all the peaks is 3% or greater, the cellulose derivative having a low molecular weight (for example, a cellulose derivative having the weight average molecular weight Mw of 10,000 to 55,000) is included in the cellulose derivatives in a desired amount. Therefore, when the resin molded article is formed, the mechanical strength may be obtained by the forming of the hydrogen bonds, the heat resistance is also enhanced, and the thermal fluidity is also increased.

The ratio of the peak area ($S_L$) and the peak area ($S_H$) is controlled by adjusting amounts of the cellulose derivative having a low molecular weight and the cellulose derivative having a high molecular weight when the cellulose derivative having a low molecular weight (for example, the weight average molecular weight Mw of 10,000 to 55,000) and the cellulose derivative having a high molecular weight (for example, the weight average molecular weight Mw of 100,000 to 235,000) are mixed.

—Resin Composition According to the Second Embodiment—

The resin composition according to the second embodiment contains mixed cellulose derivatives of the low molecular weight cellulose derivative having the weight average molecular weight Mw of 10,000 to 55,000 and the high molecular weight cellulose derivative having the weight average molecular weight Mw of 100,000 to 235,000.

The cellulose derivatives included in the resin composition according to the second embodiment are obtained, for example, by independently preparing the low molecular weight cellulose derivative having the weight average molecular weight Mw of 10,000 to 55,000 and the high molecular weight cellulose derivative having the weight average molecular weight Mw of 100,000 to 235,000, and mixing the both.

Weight Average Molecular Weight

According to the second embodiment, the weight average molecular weight Mw of the low molecular weight cellulose derivative is 10,000 to 55,000, preferably 15,000 to 50,000, and more preferably 25,000 to 45,000.

If the weight average molecular weight Mw of the low molecular weight cellulose derivative is greater than 55,000, thermal fluidity may not be obtained when a resin molded article is formed. Meanwhile, if the weight average molecular weight Mw of the low molecular weight cellulose derivative is less than 10,000, the molecular weight becomes too small, mechanical strength may not be obtained, and heat resistance is deteriorated.

According to the second embodiment, the weight average molecular weight of the high molecular weight cellulose derivative is 100,000 to 235,000, preferably 100,000 to 195,000, and more preferably 100,000 to 170,000.

If the weight average molecular weight Mw of the high molecular weight cellulose derivative is greater than 235,000, the molecular weight becomes too high, and thermal fluidity may not be obtained. Meanwhile, if the weight average molecular weight Mw of the high molecular weight cellulose derivative is less than 100,000, the mechanical strength may not be obtained, and the heat resistance is deteriorated.

According to the second embodiment, in the mixed cellulose derivatives, with respect to the total amount of the low molecular weight cellulose derivative and the high molecular weight cellulose derivative, it is preferable that the content ratio of the low molecular weight cellulose derivative is 1% by weight to 99% by weight and the content ratio of the high molecular weight cellulose derivative is 1% by weight to 99% by weight.

If the content ratios of the both are 1% by weight or greater, both of the low molecular weight cellulose derivative and the high molecular weight cellulose derivative are appropriately included. Therefore, an effect of obtaining a resin molded article having excellent mechanical strength and high thermal fluidity is satisfactorily exhibited.

Among the low molecular weight cellulose derivative and the high molecular weight cellulose derivative, the cellulose derivative of which the content is smaller is preferably the low molecular weight cellulose derivative.

The content ratio of the high molecular weight cellulose derivative with respect to the total amount of the mixed cellulose derivatives (the total amount of the low molecular weight cellulose derivative and the high molecular weight cellulose derivative) is preferably 60% by weight or greater, more preferably 70% by weight to 95% by weight, and even more preferably 80% by weight to 90% by weight.

If the content ratio of the high molecular weight cellulose derivative is 60% by weight or greater, many high molecular weight cellulose derivatives are included in the mixed cellulose derivatives, such that mechanical strength is excellent and the heat resistance is also enhanced.

Meanwhile, the content ratio of the low molecular weight cellulose derivative with respect to the total amount of the mixed cellulose derivatives is preferably 3% by weight to 40% by weight, more preferably 5% by weight to 30% by weight, and even more preferably 10% by weight to 20% by weight.

If the content ratio of the low molecular weight cellulose derivative is 3% or greater, a desired amount of the low molecular weight cellulose derivative is included in the mixed cellulose derivatives, such that mechanical strength is obtained by forming hydrogen bonds when a resin molded article is formed, heat resistance is enhanced, or the thermal fluidity increases.

Here, cellulose derivatives are described.

Hereinafter, in the case where both of the first embodiment and the second embodiment are indicated, the embodiments are simply referred to as "this embodiment".

[Cellulose Derivatives]

The cellulose derivative having a low molecular weight (for example, a cellulose derivative having the weight average molecular weight Mw of 10,000 to 55,000) and the cellulose derivative having a high molecular weight (for example, a cellulose derivative having the weight average molecular weight Mw of 100,000 to 235,000) are included in the resin composition according to the first embodiment.

Mixed cellulose derivatives of the low molecular weight cellulose derivative having the weight average molecular weight Mw of 10,000 to 55,000 and the high molecular weight cellulose derivative having the weight average molecular weight Mw of 100,000 to 235,000 are included in the resin composition according to the second embodiment.

Specifically, the cellulose derivatives (mixed cellulose derivatives) are obtained, by independently preparing the low molecular weight cellulose derivative having the weight average molecular weight Mw of 10,000 to 55,000 and the high molecular weight cellulose derivative having the weight average molecular weight Mw of 100,000 to 235,000 and mixing the both.

Hereinafter, first, structures of the cellulose derivatives are described. Thereafter, the adjustment of the molecular weight, that is, a method of preparing the cellulose derivative having a low molecular weight (for example, the weight average molecular weight Mw of 10,000 to 55,000) and the cellulose derivative having a high molecular weight (for example, the weight average molecular weight Mw of 100,000 to 235,000) is described.

Structure

The cellulose derivatives are, for example, cellulose derivatives in which cellulose is esterified with an acyl group or the like. Specifically, examples thereof include cellulose derivatives represented by formula (1).

(1)

In the formula (1), each of $R^1$, $R^2$, and $R^3$ independently represents a hydrogen atom and an acyl group. n represents an integer of 2 or greater. However, at least one of n items of $R^1$s, n items of $R^2$s, and n items of $R^3$s represents an acyl group.

The acyl group represented by $R^1$, $R^2$ or $R^3$ is preferably an acyl group having 1 to 6 carbon atoms.

Acyl Group

In the cellulose derivative used in this embodiment, at least one hydroxyl group is preferably substituted with an acyl group (more preferably an acyl group having 1 to 6 carbon atoms). That is, if the cellulose derivative has a structure represented by Formula (1), at least one of n items of $R^1$s, n items of $R^2$s, and n items of $R^3$s preferably represents an acyl group.

That is, a part or all of n number of $R^1$'s present in the cellulose derivative represented by Formula (1) may be the same as each other, and all of n number of $R^1$'s present in the cellulose ester resin may be different from each other. Likewise, a part or all of n number of $R^2$'s and a part or all of n number of $R^3$'s may be the same as or different from each other, respectively, and all of n number of $R^2$'s and all of n number of $R^3$'s may be different from each other. At least one of n number of $R^2$'s and n number of $R^3$'s represents an acyl group.

When the acyl groups is an acyl group having 1 to 6 carbon atoms, the elastic modulus is increased, and heat resistance is also improved as compared to a case where all of the acyl groups for the substitution in the cellulose ester are acyl groups having 7 or more carbon atoms. The number of carbon atoms of the acyl groups for the substitution in the cellulose derivative is preferably 1 to 4 and more preferably 1 to 3.

The acyl group is represented by a structure of "—CO—$R_{AC}$", and "$R_{AC}$" represents a hydrogen atom or a hydrocarbon group (preferably having 1 to 5 carbon atoms).

The hydrocarbon group represented by "$R_{AC}$" may have any one of a straight chain shape, a branched shape, or a cyclic shape, but more preferably a straight chain shape.

The hydrocarbon group may be a saturated hydrocarbon group or an unsaturated hydrocarbon group, but more preferably a saturated hydrocarbon group.

The hydrocarbon group may contain other atoms except for carbon or hydrogen (for example, oxygen or nitrogen), but more preferably a hydrocarbon group made of only carbon and hydrogen.

Examples of the acyl group include a formyl group, an acetyl group, a propionyl group, a butyryl group (butanoyl group), a propenoyl group, and a hexanolyl group.

However, a propionyl group and a butyryl group originally have characteristics of enhancing the thermal fluidity by being present on the cellulose derivative as a substituent, and thus the effect of enhancing the thermal fluidity according to this embodiment is hardly exhibited. Therefore, in view of exhibiting the effect of this embodiment, it is not preferable for the cellulose derivative to be substituted with a propionyl group and a butyryl group.

Among acyl groups described above, in view of the enhancement of the mechanical strength (elastic modulus) and the heat resistance, and the enhancement of the moldability of the resin composition, an acetyl group is preferable.

Substitution Degree

A substitution degree of the cellulose derivatives is preferably 2.2 to 2.6 and more preferably 2.35 to 2.5.

If the substitution degree is 2.6 or lower, the interaction between substituents does not become too strong, and the deterioration of mobility of molecules is prevented, such that hydrogen bonds between molecules easily occur, and therefore, not only elastic modulus further increases but also heat resistance further increases. If the substitution degree is 2.2 or greater, interaction between molecules does not become too small, and the plasticization is prevented, such that the elastic modulus further increases and the heat resistance also further increases.

The substitution degree is an index indicating a degree of acylation of a cellulose derivative. Specifically, the substitution degree means an intermolecular average of the number of substitutions in which three hydroxyl groups included in a D-glucopyranose unit of the cellulose derivative are substituted with an acyl group.

Synthesis Method

The cellulose derivatives used in this embodiment, that is, the cellulose derivative having a low molecular weight (specifically, the cellulose derivative having the weight average molecular weight Mw of 10,000 to 55,000) and the cellulose derivative having a high molecular weight (specifically, the cellulose derivative having the weight average molecular weight Mw of 100,000 to 235,000) are not particularly limited, and independently synthesized, for example, by the following methods.

(Adjustment of Molecular Weight of Cellulose)

First, cellulose before acylation, that is, cellulose of which an hydroxyl group is not substituted with an acyl group, is prepared and the molecular weight thereof is adjusted.

As the cellulose before acylation, prepared cellulose may be used or commercially available cellulose may be used. The cellulose is usually a resin derived from plants, and the weight average molecular weight thereof is generally higher than that of the low molecular cellulose derivative used in this embodiment. Therefore, at least the adjustment of the molecular weight of the cellulose for the low molecular cellulose derivative generally becomes a step of decreasing the molecular weight.

The molecular weight of the cellulose for the cellulose derivative having a high molecular weight may be adjusted.

For example, the weight average molecular weight of the commercially available cellulose is generally in the range of 150,000 to 500,000.

Examples of the commercially available cellulose before acylation include KC FLOCK W50, W100, W200, W300G, W400G, W-100F, W60MG, W-50GK, W-100GK, NDPT, NDPS, LNDP, and NSPP-HR manufactured by Nippon Paper Industries Co., Ltd.

The method of adjusting a molecular weight of the cellulose before acylation is not particularly limited, but examples thereof include a method of decreasing the molecular weight by stirring the cellulose in liquid.

By adjusting the speed and the time when the cellulose is stirred, the molecular weight of the cellulose may be adjusted to a required value. In addition, though not particularly limited, the stirring speed when the cellulose is stirred is preferably in the range of 50 rpm to 3,000 rpm, and more preferably in the range of 100 rpm to 1,000 rpm. In addition, the stirring time is preferably in the range of 2 hours to 48 hours, and more preferably in the range of 5 hours to 24 hours.

Examples of the liquid used when the cellulose is stirred include an aqueous solution of hydrochloric acid, an aqueous solution of formic acid, an aqueous solution of acetic acid, an aqueous solution of nitric acid, and an aqueous solution of sulfuric acid.

(Preparation of Cellulose Derivatives)

If the cellulose for the low molecular weight cellulose derivative and the cellulose for the high molecular weight cellulose derivative prepared by the methods described above are acylated with an acyl group by a well-known method, so that the cellulose derivatives may be obtained.

The mixture of the cellulose derivative having a low molecular weight and the cellulose derivative having a high molecular weight may be performed before the acylation step, that is, acylation may be performed on the cellulose after mixture. The acylation steps may be performed independently, so as to prepare the cellulose derivative having a low molecular weight and the cellulose derivative having a high molecular weight, respectively, and the both may be mixed after acylation.

In the case where the hydroxyl groups included in the cellulose is partially substituted with an acetyl group, examples thereof include the method of esterifying the cellulose by using the mixture of acetic acid, acetic anhydride, and sulfuric acid. In the case where the hydroxyl groups included in the cellulose are partially substituted with a hexanoyl group, examples thereof include a method of performing esterification by using hexanoic anhydride in place of acetic anhydride in the above mixture.

After acylation, in order to adjust the substitution degree, a deacylation step may be further performed. In addition, after the acylation step or the deacylation step, a step of further refining the cellulose may be preformed.

Ratios Occupied in Resin Composition

In the resin composition according to this embodiment, the ratio occupied by the cellulose derivatives (mixed cellulose derivatives in the second embodiment) with respect to the total amount of the resin composition is 70% by weight or more and more preferably 80% by weight or more. If the ratio is 70% by weight or greater, an elastic modulus increases, mechanical strength enhances, and heat resistance becomes higher.

Subsequently, other components included in the resin composition according to this embodiment are described.

[Plasticizer]

The resin composition according to this embodiment may further contain a plasticizer.

The content of the plasticizer is preferably an amount in which the ratio of the cellulose derivatives (the mixed cellulose derivatives according to the second embodiment) occupying the entire resin composition is in the range described above. Specifically, the ratio of the plasticizer occupying the entire resin composition is preferably 15% by weight or less, more preferably 10% by weight or less, and even more preferably 5% by weight or less. If the ratio of the plasticizer is in the range described above, the elastic modulus further increases, and the heat resistance further increases. The bleeding of the plasticizer is prevented.

Examples of the plasticizer include an adipic acid ester-containing compound, a polyether ester compound, a sebacic acid ester compound, a glycol ester compound, an acetic acid ester, a dibasic acid ester compound, a phosphoric acid ester compound, a phthalic acid ester compound, camphor, citric acid ester, stearic acid ester, metallic soap, polyol, and polyalkylene oxide.

Among these, an adipic acid ester-containing compound and a polyether ester compound are preferable, and an adipic acid ester-containing compound is more preferable.

—Adipic Acid Ester-Containing Compound—

An adipic acid ester-containing compound (compound containing adipic acid ester) refers to a compound of individual adipic acid esters, and a mixture of adipic acid ester and components other than adipic acid ester (compound different from adipic acid ester). However, the adipic acid ester-containing compound may contain the adipic acid ester by 50% by weight or more with respect to the total component.

The adipic acid ester-containing compound has a high affinity with cellulose derivatives and, if the adipic acid ester-containing compound is dispersed in the cellulose derivatives in an almost even state, thermal fluidity of the adipic acid ester-containing compound is enhanced compared with the other plasticizers.

As the adipic acid ester, for example, adipic acid diester, and adipic acid polyester are exemplified. Specifically, adipic acid diester represented by the formula (2-1) and adipic acid polyester represented by the formula (2-2) are exemplified.

(2-1)

(2-2)

(3)

In the formulae (2-1) and (2-2), $R^4$ and $R^5$ each independently represents an alkyl group, or a polyoxyalkyl group $[-(C_xH_{2x}-O)_y-R^{41}]$ (provided that $R^{41}$ represents an alkyl group, x represents an integer in the range of 1 to 10, and y represents an integer in the range of 1 to 10.).

$R^6$ represents an alkylene group.

m1 represents an integer in the range of 1 to 20.

m2 represents an integer in the range of 1 to 10.

In the formulae (2-1) and (2-2), the alkyl groups represented by $R^4$ and $R^5$ are preferably alkyl groups having 1 to 6 carbon atoms, and more preferably alkyl groups having 1 to 4 carbon atoms. The alkyl groups represented by $R^4$ and $R^5$ may have any one of a linear shape, a branched shape, or a cyclic shape, but preferably a linear shape and a branched shape.

In the formulae (2-1) and (2-2), in the polyoxyalkyl group represented by $R^4$ and $R^8$ $[-(C_xH_{2x}-O)_y-R^{41}]$, the alkyl group represented by $R^{41}$ is preferably an alkyl group having 1 to 6 carbon atoms, and more preferably an alkyl group having 1 to 4 carbon atoms. The alkyl group represented by $R^{41}$ may have any one of a linear shape, a branched shape, or a cyclic shape, but preferably a linear shape and a branched shape.

In the formula (2-2), the alkylene group represented by $R^6$ is preferably an alkylene group having 1 to 6 carbon atoms, and more preferably an alkylene group having 1 to 4 carbon atoms. The alkylene group represented by $R^6$ may have any one of a linear shape, a branched shape, or a cyclic shape, but preferably a linear shape and a branched shape.

In the formulae (2-1) and (2-2), the group represented by each of symbols $R^4$ to $R^6$ may be substituted with a substituent. As the substituent, an alkyl group, an aryl group, and a hydroxyl group are exemplified.

The molecular weight of the adipic acid ester (or weight average molecular weight) is preferably in the range of 200 to 5,000, and more preferably in the range of 300 to 2,000. The weight average molecular weight is a value measured according to the method of measuring the weight average molecular weight of the cellulose derivative described above.

Specific examples of the adipic acid ester-containing compound are described below, but the invention is not limited thereto.

| | Name of Material | Name of Product | Manufacturer |
|---|---|---|---|
| ADP1 | Adipic acid diester | Daifatty 101 | Daihachi Chemical Industry Co., Ltd. |
| ADP2 | Adipic acid diester | Adeka Cizer RS-107 | ADEKA Corporation |
| ADP3 | Adipic acid polyester | Polycizer W-230-H | DIC Corporation |

Polyether Ester Compound

As the polyether ester compound, or example, a polyether ester compound represented by the formula (3) is exemplified.

In the formula (3), $R^7$ and $R^8$ each independently represents an alkylene group having 2 to 10 carbon atoms. $A^1$ and $A^2$ each independently represents an alkyl group having 1 to 6 carbon atoms, an aryl group having 6 to 12 carbon atoms, or an aralkyl group having 7 to 18 carbon atoms. m represents an integer of 1 or greater.

In the formula (3), as the alkylene group represented by $R^7$, an alkylene group having 3 to 10 carbon atoms is preferable, and an alkylene group having 3 to 6 carbon atoms is more preferable. The alkylene group represented by $R^7$ may have any one of a linear shape, a branched shape, or a cyclic shape, but preferably a linear shape.

If the number of carbons of the alkylene group represented by $R^7$ is set to be 3 or greater, the decrease of the fluidity of the resin composition is prevented, and thermoplasticity is easily exhibited. If the number of carbons of the alkylene group represented by $R^7$ is 10 or lower, or the alkylene group represented by $R^7$ has a linear shape, the affinity to the cellulose derivative is easily enhanced. Therefore, if the alkylene group represented by $R^7$ has a linear shape, and the number of carbons is in the range described above, moldability of the resin composition is enhanced.

In this point of view, particularly, the alkylene group represented by $R^7$ is preferably a n-hexylene group $(-(CH_2)_6-)$. That is, the polyether ester compound is preferably a compound where $R^7$ represents a n-hexylene group $(-(CH_2)_6-)$.

In the formula (3), as the alkylene group represented by $R^8$, an alkylene group having 3 to 10 carbon atoms is preferable, and an alkylene group having 3 to 6 carbon atoms is more preferable. The alkylene group represented by $R^8$ may have any one of a linear shape, a branched shape, or a cyclic shape, but preferably a linear shape.

If the number of carbons of the alkylene group represented by $R^8$ is 3 or greater, the decrease of the fluidity of the resin composition is prevented, and the thermoplasticity is easily exhibited. If the number of carbons of the alkylene group represented by $R^8$ is 10 or lower, or if the alkylene group represented by $R^8$ has a linear shape, the affinity to the cellulose derivative is easily enhanced. Therefore, if the alkylene group represented by $R^8$ has a linear shape, and the number of carbons is in the range described above, moldability of the resin composition is enhanced.

In this point of view, particularly, the alkylene group represented by $R^8$ is preferably a n-butylene group $(-(CH_2)_4-)$. That is, the polyether ester compound is preferably a compound where $R^8$ represents a n-butylene group $(-(CH_2)_4-)$.

In the formula (3), the alkyl groups represented by $A^1$ and $A^2$ are alkyl groups having 1 to 6 carbon atoms, and alkyl groups having 2 to 4 carbon atoms are more preferable. The alkyl groups represented by $A^1$ and $A^2$ may have anyone of a linear shape, a branched shape, or a cyclic shape, but preferably a branched shape.

The aryl groups represented by $A^1$ and $A^2$ are aryl groups having 6 to 12 carbon atoms, and as examples thereof, an unsubstituted aryl group such as a phenyl group and a naphthyl group or a substituted phenyl group such as a t-butylphenyl group and a hydroxyphenyl group are exemplified.

The aralkyl group represented by $A^1$ and $A^2$ is a group represented by —$R^4$-Ph. $R^4$ represents a linear-shaped or branched alkylene group having 1 to 6 carbon atoms (preferably, having 2 to 4 carbon atoms). Ph represents an unsubstituted phenyl group or a substituted phenyl group which is substituted with the linear-shaped or branched alkyl group having 1 to 6 carbon atoms (preferably, having 2 to 6 carbon atoms). As the aralkyl group, specifically, for example, an unsubstituted aralkyl group such as a benzil group, a phenylmethyl group (phenethyl group), a phenylpropyl group, and a phenylbutyl group, and a substituted aralkyl group such as a methylbenzil group, a dimethylbenzil group, and a methylphenethyl group are exemplified.

At least one of $A^1$ and $A^2$ preferably represents an aryl group or an aralkyl group. That is, the polyether ester compound is preferably a compound where at least one of $A^1$ and $A^2$ represents an aryl group (preferably, phenyl group) or an aralkyl group, and preferably a compound where both of $A^1$ and $A^2$ represent an aryl group (preferably, phenyl group) or an aralkyl group.

Subsequently, characteristics of the polyether ester compound are described.

The weight average molecular weight (Mw) of the polyether ester compound is preferably in the range of 450 to 650, and more preferably in the range of 500 to 600.

If the weight average molecular weight (Mw) is 450 or greater, bleeding (phenomenon of deposition) becomes difficult. If the weight average molecular weight (Mw) is 650 or lower, the affinity to the cellulose derivative is easily enhanced. Therefore, if the weight average molecular weight (Mw) is in the range described above, moldability of the resin composition is enhanced.

In addition, the weight average molecular weight (Mw) of the polyether ester compound is a value measured by gel permeation chromatography (GPC). Specifically, the measurement of the molecular weight by GPC is performed by using HPLC1100 manufactured by Tosoh corporation as a measurement apparatus, and TSKgel GMHHR-M+TSKgel GMHHR-M (7.8 mm I.D. 30 cm) which is a column manufactured by Tosoh Corporation, with a chloroform solvent. Also, the weight average molecular weight is calculated by using a molecular weight calibration curve obtained by a monodispersed polystyrene standard sample from the measurement result.

The viscosity of the polyether ester compound at 25° C. is preferably in the range of 35 mPa·s to 50 mPa·s, and more preferably in the range of 40 mPa·s to 45 mPa·s.

If the viscosity is 35 mPa·s or greater, the dispersibility to the cellulose derivative is easily enhanced. If the viscosity is 50 mPa·s or lower, anisotropy of the dispersion of the polyether ester compound hardly appears. Therefore, if the viscosity is in the range described above, the moldability of the resin composition is enhanced.

In addition, the viscosity is a value measured by an E-type viscosmeter.

A solubility parameter (SP value) of the polyether ester compound is preferably in the range of 9.5 to 9.9, and more preferably in the range of 9.6 to 9.8.

If the solubility parameter (SP value) is in the range of 9.5 to 9.9, dispersibility to the cellulose derivative is easily enhanced.

The solubility parameter (SP value) is a value calculated by a Fedor method, and specifically, the solubility parameter (SP value) is, for example, calculated by the following equation in conformity with the description in Polym. Eng. Sci., vol. 14, p. 147 (1974).

Equation: SP value=$\sqrt{(Ev/v)}=\sqrt{(\Sigma\Delta ei/\Sigma\Delta vi)}$ (In the equation, Ev: evaporation energy (cal/mol), v: molar volume (cm$^3$/mol), $\Delta$ei: evaporation energy of each atom or atom group, and $\Delta$vi: molar volume of each atom or atom group)

In addition, the solubility parameter (SP value) employs (cal/cm$^3$)$^{1/2}$ as a unit, but the unit is omitted in conformity with practice, and is described in a dimensionless manner.

Hereinafter, specific examples of the polyether ester compound are described, but the invention is not limited thereto. The Hazen color number (APHA) is a value measured according to JIS-K0071 (1998). The Hazen color number (APHA) is not limited, but it is preferably 100 to 140, and more preferably 100 to 120.

| | $R^7$ | $R^8$ | $A^1$ | $A^2$ | Mw | Viscosity (25° C.) | APHA | SP value |
|---|---|---|---|---|---|---|---|---|
| PEE1 | —(CH$_2$)$_6$— | —(CH$_2$)$_4$— | Phenyl group | Phenyl group | 550 | 43 | 120 | 9.7 |
| PEE2 | —(CH$_2$)$_2$— | —(CH$_2$)$_4$— | Phenyl group | Phenyl group | 570 | 44 | 115 | 9.4 |
| PEE3 | —(CH$_2$)$_{10}$— | —(CH$_2$)$_4$— | Phenyl group | Phenyl group | 520 | 48 | 110 | 10.0 |
| PEE4 | —(CH$_2$)$_6$— | —(CH$_2$)$_2$— | Phenyl group | Phenyl group | 550 | 43 | 115 | 9.3 |
| PEE5 | —(CH$_2$)$_6$— | —(CH$_2$)$_{10}$— | Phenyl group | Phenyl group | 540 | 45 | 115 | 10.1 |
| PEE6 | —(CH$_2$)$_6$— | —(CH$_2$)$_4$— | t-Butyl group | t-Butyl group | 520 | 44 | 130 | 9.7 |
| PEE7 | —(CH$_2$)$_6$— | —(CH$_2$)$_4$— | Phenyl group | Phenyl group | 460 | 45 | 125 | 9.7 |
| PEE8 | —(CH$_2$)$_6$— | —(CH$_2$)$_4$— | Phenyl group | Phenyl group | 630 | 40 | 120 | 9.7 |
| PEE9 | —(CH$_2$)$_6$— | —(CH$_2$)$_4$— | Phenyl group | Phenyl group | 420 | 43 | 135 | 9.7 |
| PEE10 | —(CH$_2$)$_6$— | —(CH$_2$)$_4$— | Phenyl group | Phenyl group | 670 | 48 | 105 | 9.7 |
| PEE11 | —(CH$_2$)$_6$— | —(CH$_2$)$_4$— | Phenyl group | Phenyl group | 550 | 35 | 130 | 9.7 |
| PEE12 | —(CH$_2$)$_6$— | —(CH$_2$)$_4$— | Phenyl group | Phenyl group | 550 | 49 | 125 | 9.7 |
| PEE13 | —(CH$_2$)$_6$— | —(CH$_2$)$_4$— | Phenyl group | Phenyl group | 550 | 32 | 120 | 9.7 |
| PEE14 | —(CH$_2$)$_6$— | —(CH$_2$)$_4$— | Phenyl group | Phenyl group | 550 | 53 | 105 | 9.7 |
| PEE15 | —(CH$_2$)$_6$— | —(CH$_2$)$_4$— | Phenyl group | Phenyl group | 550 | 43 | 135 | 9.7 |
| PEE16 | —(CH$_2$)$_6$— | —(CH$_2$)$_4$— | Phenyl group | Phenyl group | 550 | 43 | 105 | 9.7 |
| PEE17 | —(CH$_2$)$_6$— | —(CH$_2$)$_4$— | Phenyl group | Phenyl group | 550 | 43 | 150 | 9.7 |
| PEE18 | —(CH$_2$)$_6$— | —(CH$_2$)$_4$— | Phenyl group | Phenyl group | 550 | 43 | 95 | 9.7 |

Other Components

The resin composition according to the exemplary embodiment may contain other components in addition to the components described above, if necessary. As the other components, for example, a flame retardant, a compatibilizer, an antioxidant, a release agent, a light resistant agent, a weather resistant agent, a colorant, pigments, a modifier, a drip preventing agent, an antistatic agent, a hydrolysis inhibitor, a filler, and a reinforcing agent (glass fiber, carbon fiber, talc, clay, mica, glass flake, milled glass, glass bead, crystalline silica, alumina, silicon nitride, aluminum nitride, boron nitride, and the like) are exemplified. The content of the respective components is in the range of 0% by weight to 5% by weight with respect to the total amount of the resin composition. Here, the expression "0% by weight" means not including other components.

The resin composition according to the exemplary embodiment may contain other resins in addition to the resin described above. However, the other resins are included in amounts with which the ratio of the cellulose derivative occupied in the total amount of the resin composition becomes in the range described above.

As the other resins, for example, the thermoplastic resins which are well-known in the art are included. Specifically, polycarbonate resin; polypropylene resin; polyester resin; a polyolefin resin; polyester carbonate resin; a polyphenylene ether resin; polyphenylene sulfide resin; a polysulfone resin; polyether sulfone resin; a polyarylene resin; a polyetherimide resin; a polyacetal resin; a polyvinyl acetal resin; a polyketone resin; a polyetherketone resin; a polyetheretherketone resin; a polyarylketone resin; a polyether nitrile resin; a liquid crystal resin; a polybenzimidazole resin; polyparabanic acid resin; a vinyl polymer or a vinyl copolymer resin obtained by polymerizing or copolymerizing one or more vinyl monomers selected from the group consisting of an aromatic alkenyl compound, a methacrylic acid ester, acrylic acid ester, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenylmaleimide copolymer resin; a vinyl cyanide-(ethylene-diene-propylene (EPDM))-aromatic alkenyl compound copolymer resin; a vinyl chloride resin; and a chlorinated vinyl chloride resin are exemplified. These resins may be used singly, or two or more types thereof may be used in combination.

Method of Preparing Resin Composition

The resin composition according to the exemplary embodiment, for example, is prepared by molten-kneading a mixture of the above-described components. In addition, the resin composition according to the exemplary embodiment, for example, is prepared by dissolving the above-described components in a solvent. For molten-kneading, known machines may be used, and specific examples thereof include a twin-screw extruder, a HENSCHEL MIXER, a BANBURY MIXER, a single-screw extruder, multi-screw extruder, and a co-kneader.

In addition, the temperature at the time of kneading may be determined according to the melting temperature of the cellulose derivatives used, but in view of the thermal decomposition and the fluidity, the temperature in the range of 140° C. to 240° C. is preferable, and the temperature in the range of 160° C. to 200° C. is more preferable.

Resin Molded Article

The resin molded article according to the exemplary embodiment includes the resin composition according to the exemplary embodiment. That is, the resin molded article according to the exemplary embodiment is made of the same composition as the resin composition according to the exemplary embodiment.

Specifically, the resin molded article according to the exemplary embodiment may be obtained by molding the resin composition according to the exemplary embodiment. As the molding method, injection molding, extrusion molding, blow molding, heat press molding, calendaring molding, coating molding, cast molding, dipping molding, vacuum molding, transfer molding and the like may be applied.

As the method of molding the resin molded article according to the exemplary embodiment, since degrees of freedom in shape are high, injection molding is preferable. With respect to injection molding, the resin composition is heated and melted, casted into a mold, and solidified, so as to obtain a molded article. The resin composition may be molded by injection compression molding.

The cylinder temperature of the injection molding is, for example, in the range of 140° C. to 280° C., preferably in the range of 150° C. to 240° C., and more preferably in the range of 160° C. to 200° C. The mold temperature of the injection molding is, for example, in the range of 30° C. to 120° C., and more preferably in the range of 40° C. to 80° C. The injection molding may be performed, for example, by using a commercially available apparatus such as NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., and SE50D manufactured by Toshiba Machine Co., Ltd.

The resin molded article according to the exemplary embodiment may be appropriately used for the purposes of electric and electronic apparatuses, business machines, home appliances, automobile interior materials, engine covers, car bodies, containers, and the like. More specifically, the resin molded article may be used in housings of electric and electronic apparatuses or home appliances; various components of electric and electronic apparatuses or home appliances; interior components of automobiles; storage cases of CD-ROM, DVD, and the like; food containers; drink bottles; food trays; wrapping materials; films; and sheets.

EXAMPLES

Hereinafter, the invention is described in greater detail with reference to examples, but the invention is not limited to the examples. In addition, unless described otherwise, the expression "part" refers to "part by weight".

Preparation of High Molecular Cellulose and Low Molecular Cellulose 2 kg of cellulose (KC Flock W50 manufactured by Nippon Paper Industries Co., Ltd.) is put to 20 L of an aqueous solution of 0.1 M hydrochloric acid, and stirred at room temperature (25° C.). In stirring time shown in Table 1, cellulose in respective molecular weights is obtained. In addition, EP-1800 (product name, manufactured by Shinto Scientific Co., Ltd.) is used as a stirring apparatus, and the rotation speed at the time of stirring is set to 500 rpm.

The weight average molecular weight is measured with a GPC apparatus (manufactured by Tosoh corporation, HLC-8320GPC, Column: TSKgel α-M), by using a solution of dimethylacetamide/lithium chloride having a volume ratio of 90/10 and pullulan (Shodex Standard P-82) as a standard substance.

TABLE 1

|  | Stirring time (hr) | Weight average molecular weight |
| --- | --- | --- |
| High molecular weight Cellulose H1 | 0.5 | 63,000 |
| Low molecular weight Cellulose L1 | 2.5 | 27,000 |
| Comparative Cellulose 1 | 1.5 | 41,000 |

<Preparation of High Molecular Weight Cellulose Derivative and Low Molecular Weight Cellulose Derivative>

(Acetylation Step)

Pretreatment activation is performed by spraying 1 kg of cellulose for high molecular weight cellulose derivative H1 in Table 1 and 500 g of glacial acetic acid. Thereafter, a mixture of 3.8 kg of glacial acetic acid, 2.4 kg of acetic anhydride, and 80 g of sulfuric acid is added, and esterification is performed while the mixture is stirred and mixed at temperature of 40° C. or lower. Esterification is finished when fiber fragments disappear.

(Deacetylation Step)

2 kg of acetic acid and 1 kg of water are added to the mixture and stirred for 2 hours in room temperature (25° C.)

(Refinement Step)

This solution is slowly dripped to a solution obtained by dissolving 20 kg of sodium hydroxide in 40 kg of water while the solution is stirred. The obtained white precipitate is suction-filtered and washed with 60 kg of water, so as to obtain the high molecular weight cellulose derivative H1.

Low molecular weight cellulose derivative L1 and comparative cellulose derivative 1 are obtained in the same manner as above except for changing the cellulose for high molecular weight cellulose derivative H1 to cellulose for low molecular weight cellulose derivative L1 and comparative cellulose 1.

The molecular weight is measured with a GPC apparatus (manufactured by Tosoh corporation, HLC-8320GPC, Column: TSKgel α-M) by using tetrahydrofuran (THF) and using polystyrene (TSK standard POLYSTYRENE) as a standard substance, and substitution degrees are obtained with $H^1$-NMR measurement (JNM-ECZR manufactured by JEOL Ltd.).

The results are collectively presented in Table 2.

TABLE 2

|  | Weight average molecular weight Mw | Number average molecular weight Mn | Substituent | Substitution degree |
|---|---|---|---|---|
| High molecular weight cellulose derivative H1 | 131,000 | 52,000 | Acetyl | 2.45 |
| Low molecular weight cellulose derivative L1 | 35,000 | 12,000 | Acetyl | 2.39 |
| comparative cellulose derivative 1 | 78,000 | 33,000 | Acetyl | 2.42 |

<Preparation of Pellets>

Examples 1 to 5

Preparation is performed such that the high molecular weight cellulose derivative H1 and the low molecular weight cellulose derivative L1 are mixed such that the ratios of the peak area ($S_L$) (low molecular weight peak area) of the peak including the maximum ($P_L$) and the peak area ($S_H$) (high molecular weight peak area) of the peak including the maximum ($P_H$) with respect to the total area of all the peaks in the molecular weight distribution curve become the preparation composition ratios of values presented in Table 3, and the amount of a plasticizer (adipic acid ester, Daifatty 101 manufactured by Daihachi Chemical Industry Co., Ltd.) becomes the value presented in Table 3. This is kneaded with a twin-screw kneading apparatus (TEX41SS manufactured by Toshiba Machine Co., Ltd.) at a kneading temperature of 230° C., so as to obtain resin composition pellets.

Comparative Examples 1 to 4

Preparation is performed by only using the high molecular weight cellulose derivative H1 in Comparative Example 1, only using the low molecular weight cellulose derivative L1 in Comparative Example 2, and only using the comparative cellulose derivative 1 in Comparative Examples 3 and 4, such that the amount of the plasticizer (adipic acid ester, Daifatty 101 manufactured by Daihachi Chemical Industry Co., Ltd.) becomes the value presented in Table 3. This is kneaded with a twin-screw kneading apparatus (TEX41SS manufactured by Toshiba Machine Co., Ltd.) at a kneading temperature of 230° C., so as to obtain resin composition pellets.

The obtained pellets were measured with a GPC apparatus (manufactured by Tosoh corporation, HLC-8320GPC, Column: TSKgel α-M) by using a liquid of dimethyl acetamide/lithium chloride having a volume ratio of 90/10 so as to draw a molecular weight distribution curve, and respective maximum values, peak areas, or the like are thus obtained.

TABLE 3

|  | GPC | | | Ratio with respect to total peak area (%) | | Plasticizer adding amount (phr) |
|---|---|---|---|---|---|---|
|  | Mw | Maximum ($P_L$) in low molecular weight region | Maximum ($P_H$) in high molecular weight region | Low molecular weight peak area | High molecular weight peak area |  |
| Example 1 | 126,000 | 31,000 | 110,000 | 7% | 93% | 12.5 |
| Example 2 | 110,000 | 31,000 | 110,000 | 12% | 88% | 12.5 |
| Example 3 | 80,000 | 31,000 | 110,000 | 17% | 83% | 12.5 |
| Example 4 | 69,000 | 31,000 | 110,000 | 28% | 72% | 12.5 |
| Example 5 | 130,000 | 31,000 | 110,000 | 4% | 96% | 12.5 |
| Comparative Example 1 | 132,000 | — | 110,000 | — | 100% | 12.5 |
| Comparative Example 2 | 35,000 | 31,000 | — | 100% | — | 12.5 |
| Comparative Example 3 | 78,000 | 68,000 | — | — | — | 12.5 |
| Comparative Example 4 | 78,000 | 68,000 | — | — | — | 25 |

<Injection Molding>

The obtained pellets are molded to an ISO multipurpose dumbbell test piece (dimensions of the portion to be measured: width: 10 mm, thickness: 4 mm) and an ISO small square test piece (length of the square plate: 60 mm, width of square plate 60 mm, thickness: 2 mm) at cylinder temperature of 250° C. and a mold temperature of 40° C. by using an injection molding machine (NEX140III manufactured by Nissei Plastic Industrial Co., Ltd.).

[Evaluation Test]

—Melt Viscosity η—

With respect to the obtained pellets (the resin composition), melt viscosity (Pa·s) is measured at the respective conditions of 230° C., 240° C., and 250° C., by using CAPIROGRAPH 1C (manufactured by Toyo Seiki Seisaku-sho Ltd.) in conformity with JIS K7199 (1999), at a shear rate of 1216/s.

—Tensile Elastic Modulus—

Tensile elastic modulus is measured by using the obtained ISO multipurpose dumbbell test piece and a universal test device (AUTOGRAPH AG-Xplus manufactured by Shimadzu Corporation), in a method in conformity with ISO527.

—Charpy Impact Strength—

The obtained ISO multipurpose dumbbell test piece is processes to an impact test piece with notch by a method in conformity with ISO179, impact strength with notch is measured at 23° C. with an impact strength measuring device (Charpy automated impact tester CHN3 type manufactured by Toyo Seiki Seisaku-Sho, Ltd.).

—Bleed-Out Test—

With respect to the obtained ISO small square test piece, letters are written on the surface thereof with oil ink, and this square plate is kept for 1,000 hours (hr.) under the condition of 65° C./90% RH. The bleed-out state on the surface of the test piece is evaluated in the following criteria.

A: There is no blur of the oil ink letters. Bleed-out of the plasticizer is not visually seen.

B: Bleed-out is partially seen, and the oil ink letters are partially blurred.

C: Blur of the oil ink letters is obviously formed, or Bleed-out of the plasticizer is visually and obviously seen.

TABLE 4

| | Viscosity η (1216/s) | | | Tensile elastic modulus | Charpy impact strength | Bleeding out |
|---|---|---|---|---|---|---|
| | 230° C. | 240° C. | 250° C. | (MPa) | (kJ/m$^2$) | test |
| Example 1 | 715 | 288 | 180 | 3,000 | 8 | A |
| Example 2 | 480 | 221 | 170 | 3,000 | 7.5 | A |
| Example 3 | 350 | 174 | 150 | 2,800 | 7 | A |
| Example 4 | 270 | 151 | 140 | 2,700 | 6 | A |
| Example 5 | 980 | 327 | 180 | 3,000 | 7.5 | A |
| Comparative Example 1 | 1200 | 477 | 195 | 3,000 | 8 | A |
| Comparative Example 2 | 115 | 90 | 64 | 2,400 | 2 | A |
| Comparative Example 3 | 700 | 162 | 150 | 3,000 | 4 | A |
| Comparative Example 4 | 350 | 133 | 115 | 2,200 | 5 | C |

The pellets (resin compositions) of Examples 1 to 5 are pellets that are obtained by mixing the low molecular weight cellulose derivative having the weight average molecular weight of 10,000 to 55,000 and the high molecular weight cellulose derivative having the weight average molecular weight of 100,000 to 235,000. Also, in the molecular weight distribution curve by GPC, the maximum ($P_L$) exists in the low molecular weight region of 10,000 to 40,000 and the maximum ($P_H$) exists in the high molecular weight region of 100,000 to 180,000, cellulose derivatives having the ratio of the peak area ($S_L$) of 1% to 99% and having the ratio of the peak area ($S_H$) of 1% to 99% with respect to the total amount of the peak area ($S_L$) of the peak including the maximum ($P_L$) and the peak area ($S_H$) of the peak including the maximum ($P_H$) are contained. In Examples 1 to 5, compared with Comparative Examples 1 to 4, the resin molded articles having excellent mechanical strength (tensile elastic modulus and charpy impact strength) may be obtained, and high thermal fluidity (melt viscosity) is exhibited.

Particularly, it is understood that, in Example 1 in which a small amount of low molecular weight cellulose derivatives (maximum ($P_L$)=31,000) is used together in a small amount, that is, in the ratio of the peak areas in the molecular weight distribution curve "low molecular weight peak area: high molecular weight peak area=7%:93%", the melt viscosity η at 230° C. is decreased to an intermediate value between that of Comparative Example 1 only using the high molecular weight cellulose derivatives (maximum ($P_H$)=110,000) and that of Comparative Example 2 only using the low molecular weight cellulose derivatives (maximum ($P_L$)=31,000).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
    cellulose derivatives, in which at least one hydroxyl group is substituted with an acyl group,
    wherein, in a molecular weight distribution curve obtained by subjecting the cellulose derivatives to gel permeation chromatography (GPC), a maximum ($P_L$) exists in a low molecular weight region of 10,000 to 40,000 and a maximum ($P_H$) exists in a high molecular weight region of 100,000 to 180,000, and
    with respect to a total amount of a peak area ($S_L$) of a peak including the maximum ($P_L$) and a peak area ($S_H$) of a peak including the maximum ($P_H$), a ratio of the peak area ($S_L$) is from 1% to 99% and a ratio of the peak area ($S_H$) is from 1% to 99%.

2. The resin composition according to claim 1, wherein a ratio of the peak area ($S_H$) is 60% or greater with respect to a total area of all peaks.

3. The resin composition according to claim 1,
wherein the cellulose derivatives have a substitution degree with the acyl group is from 2.2 to 2.6.

4. The resin composition according to claim 1, further comprising:
an adipic acid ester-containing compound.

5. A resin molded article comprising:
the resin composition according to claim 1.

6. The resin molded article according to claim 4,
wherein the resin molded article is an injection molded article.

* * * * *